July 29, 1952  G. W. EDWARDS  2,605,213
METHODS FOR THE ACID REFINING OF HYDROCARBONS
Filed May 5, 1950
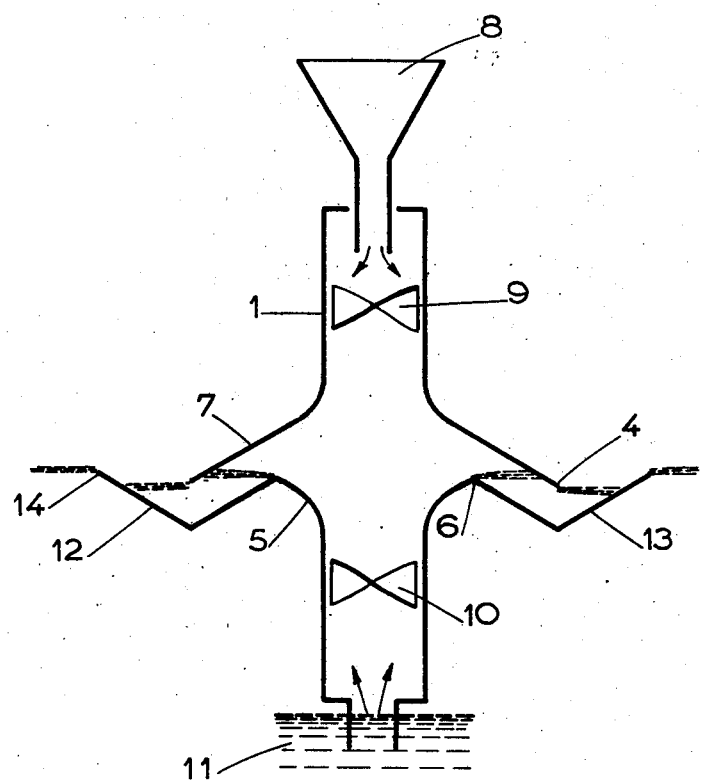
INVENTOR
GEORGE W. EDWARDS
BY
Jewett, Mead & Braun
ATTORNEYS Patented July 29, 1952

2,605,213

UNITED STATES PATENT OFFICE 2,605,213

METHODS FOR THE ACID REFINING OF HYDROCARBONS

George W. Edwards, Mitry-le-Neuf, France, assignor to Societe Anonyme Française pour la Separation, l'Emulsion et le Melange (Procedes S. E. M.), Paris, France, a corporation of France Application May 5, 1950, Serial No. 160,141
In France May 9, 1949

9 Claims. (Cl. 196—40)

It is a known fact that the so called acid refining methods for hydrocarbons consist in causing oleum (fuming sulphuric acid) to act on hydrocarbons after which the tar formed is removed and lastly the hydrocarbons are submitted to neutralisation followed by a treatment through adsorbing earths.

The first condition to be satisfied in order to obtain the desired refining consists in executing a complete sulphonation of all the unsaturated hydrocarbon molecules.

It is consequently necessary for all the particles of oil to be treated to be set into actual contact with the oleum.

Several methods for contacting such substances have already been proposed, such for instance as:

1. The introduction of acid in the desired proportions into a centrifugal pump inside which flows a stream of oil.
2. An injection of acid in the desired proportion into the oil before introduction into blade or the like mixers or else directly into the mixers.

Under such conditions, the contact is obtained at first through streamlets or masses of acid entering the oil after which the mixture is stirred as speedily as possible.

This manner of operating shows the drawback that the presence of acid in the midst of the oil leads of necessity to an intense total reaction between the contacting masses of acid and oil; consequently, the acid attacks not only the unstable unsaturated molecules but also the stable molecues which leads to losses of oil and consequently, to a poor operative efficiency.

Furthermore, in spite of the intense stirring, certain particles of hydrocarbons are not touched by the acid and the reaction is incomplete for this reason.

There are also produced at the beginning of the reaction, sheaths of tar at the surface of the masses of acid, which has for its result the separation of the oil from the acid particles so that portions of the acid are not used. Lastly, the reaction between the oil and the acid being exothermic, the temperature rises in presence of the masses of acid to an uncontrollable extent which increases the local deterioration of the oil and leads to a further loss of material and to a further drop in efficiency.

In brief, an imperfect initial contacting between the acid and the oil has for its result on one hand to provide an often incomplete reaction and on the other hand to lead to a loss of oil and of acid.

Now, as disclosed hereinabove, the first condition to be satisfied consists in obtaining a complete reaction and one is consequently led to increase the proportion of acid in spite of the drawbacks inherent to such a manner of operating and in particular of the losses in acid and hydrocarbons involved and it is endeavoured to limit these losses through a reduction in the time of contact and to proceed with a succession of contacting and separating steps without actually cutting out the drawbacks referred to.

It has also been attempted to improve the original contacting through atomising of the two components simultaneously inside a common chamber; said method has not provided, however, the desired results by reason of a reagglomeration of a fraction of the components before the contacting, as the separate particles have as many chances of meeting other particles of the same component as particles of the other component, so that the drawback referred to remains.

The present invention has for its object to cut out this drawback and to obtain from the very beginning of the operation a distribution as perfect as possible of the acid in the oil and consequently a reaction as regular as possible inside the mass of hydrocarbon undergoing treatment. Consequently, it becomes possible to reduce practically the amount of oleum used for the treatment to the amount that is strictly necessary for the sulphonation of the unsaturated molecules. Consequently, while obtaining a complete sulphonation of the unsaturated components, the attack of the acid on the saturated particles is cut out, which reduces the losses both of oil and of acid. The results considered are obtained in conformity with the invention by proceeding with a contacting between the oleum and the hydrocarbon through atomisation of one of said components on the other that is caused to flow as a very thin layer, the mixture obtained being then, if required, again atomised, stirred, laminated, etc.

Said result may be obtained through the use of an arrangement including two or more coaxial cones rotating at a high speed and preferably in opposite directions; one of the liquids is caused to flow over one of the cones in a manner such that said liquid when leaving the edge of the said cone under the form of a pulverulent mist submitted to the action of centrifugal force, may be precipitated on the other cone over which the other component flows as a very thin layer, the flow of the two components over the cones being adjusted through the corresponding feeding means in a manner such that the proportion between the two liquids may remain a constant one and may be held at the desired value.

An arrangement of this type is described in particular in the British patent to Soccart and Edwards, No. 461,772. In said arrangement, the oil and the acid are introduced simultaneously in the desired proportion, the oil engaging the spreading cone rotating at a high speed in one direction and the acid engaging the dispersing cone also rotating at a high speed in the opposite direction.

Thus the oil will spread over the spreading cone in the shape of a thin film flowing gradually towards the periphery of the cone.

The acid will flow over the dispersing cone also in the shape of a thin film and said film arriving at the outer periphery of the cone and being no longer supported, will be projected in the form of fine droplets onto the oil film progressing over the spreading cone.

Said droplets meeting the oil film under a suitable angle of contact and at a speed the tangential component of which is opposed to the speed of the oil film, will impinge energetically against the oil film so as to produce a perfect contacting immediately upon incorporation to said film.

After the first contacting, the mixture is atomised as it passes over the edge of the spreading cone, and abuts finally onto a cone lying at an adjustable distance. The aeration thus obtained may be used for oxidising the tar formed and this has for its advantage an easier subsequent flocculation and consequently separation of the tar from the oil undergoing treatment.

The advantages of such a method of contacting are:

(i) A continuous and complete incorporation of the acid into the oil body, in the shape of particles assuming the extreme desired fineness.

(ii) A homogeneous distribution of acid particles throughout the oil.

(iii) A dynamically antagonistic contacting of the fine acid particles in the midst of the oil film that destroys the coating of the active particles by the products of superficial reaction.

(iv) An aeration following the contacting that furthers the flocculation of the tar formed.

From these advantages there result still further advantages, to wit:

The totality of the reagent is used;

Only the oil fractions the elimination of which is desired, i. e. the unsaturated unstable molecules are attacked, which cuts out in the present case any deterioration of the saturated molecules through a local excess of acid. This provides a preferential elimination of the unsaturated molecules;

The temperature of reaction is uniform and constant throughout the liquid mass and there can arise, through an excess of acid, no local increase in temperature that might further parasitical reactions between the stable molecules and the free acid;

The turbulent contacting effect that is only transient does not allow any stirring of the already formed tar with the oil as is provided in the prior methods;

An improved flocculation of the tar formed that improves the subsequent separation.

It is of interest to give, by way of example, some comparative results obtained on one hand with the usual methods and on the other with the method according to the invention, with a view to obtaining an acid refining of oils of different viscosities.

Example I

In the case of the refining of a light oil having a viscosity of about 1.6° Engler, the operation was performed at a temperature of about 50° C.

With the usual method consisting in contacting through injection into a centrifugal pump followed by a contacting column, it was necessary to treat said oil with an amount of acid as high as 5% while retaining a contacting time of 11 minutes in order to obtain acid indices of a magnitude of 0.65 together with a coloring ranging between 2 and 3.

The same result, as far as the acid index and the coloring are concerned, have been obtained in conformity with the invention through the use of only 3% of acid with a contacting time of about 2 minutes. It is thus apparent that the amount of acid may be reduced in this case by 40% and the contacting time ceases being a factor influencing the final result.

Example II

In the case of a viscous mineral oil the viscosity of which ranges between 12 and 14° Engler, that is treated through the ordinary methods, it is necessary, in order to obtain a complete refining, to use a percentage of acid approximating 10% while the duration of contact is equal to about 11 minutes. The loss of raw material is about 16%.

Now, to obtain the same refining in conformity with the invention, it is sufficient to use a percentage of acid of about 7%. The duration of operation is then reduced to a few minutes and the losses of hydrocarbon have reached only 10 to 11%; it is apparent that through this treatment with heavy oil, the advantage of the method according to the invention is still more marked than in the case of light oil, as it allows reducing in particular the losses to a considerable extent.

I have illustrated in the single figure of accompanying diagrammatic drawing the general movement of the acid and hydrocarbons to be intimately commingled.

As illustrated, a cone 1 rotates round its axis in a direction opposed to the conical surfaces 5 and 13 coaxial therewith.

The oil to be treated is introduced through a funnel-shaped member 8 in order that it may flow over the inner surface of the cone 1 while the acid is introduced through injection at 11 onto the inner surface of the cone 5; of course the acid may as well be fed to said cone 5 through a tube coaxial with the funnel 8 and passing through same. Optionally, blades 9 and 10 may further the movement of the liquid over the corresponding cones. The oil flowing over the rapidly revolving surface 1 assumes the form of a continuous layer.

The acid flowing continuously over the cone 5 will reach the outer edge thereof at 6 and be atomised so as to impinge in a subdivided state on the oil layer on the inner surface of the cone 1 at 7 so as to mix with said oil layer.

The mixture will leave in its turn the cone 1 along its outer edge 4 and form a dispersion in air that strikes the third conical surface 13 at 12. Consequently the movement of the mixture flowing over said surface from 12 to 14 will ensure a further mixing effect, while the tar contained in the oil is oxidised by air firstly beyond the ridge 6 and principally beyond the ridge 4. The mixture leaving the surface 13 at 14 is finally collected and allowed to react for a few minutes longer.

The proportion of acid with reference to oil is easily adjusted as required through the suction provided by the flow of oil or in any other suitable manner.

Obviously it is irrelevant whether the spray of acid impinges on the sheet of oil or if a spray of oil impinges on a sheet of acid.

Obviously also, numerous modifications may be brought to the execution of my invention without unduly widening its scope as defined in accompanying claims.

What I claim is:

1. A method for refining hydrocarbons through concentrated sulphuric acid consisting in atomising one of the components of the acid and hydrocarbon mixture to be produced and causing it to impinge at a relative high speed into a thin layer of the other component, the proportion of acid to hydrocarbon corresponding exactly to that required for saturating the unsaturated components of the hydrocarbons.

2. In a method for refining hydrocarbons, the step consisting in forming coaxial conical sheets of sulphuric acid and of hydrocarbons rotating at a high relative speed round their axis to form a spray of one of said components, the acid and the hydrocarbons, directed towards the conical sheet of the other component, the proportion between the output of the two components corresponding to a substantially accurate saturation by the acid of the unsaturated hydrocarbon molecules.

3. In a method for refining hydrocarbons, the step consisting in forming coaxial conical sheets of sulphuric acid and of hydrocarbons rotating at a high relative speed round their axis to form a spray of one of said components, the acid and the hydrocarbons, directed towards the conical sheet of the other component, the proportion between the output of the two components corresponding to a substantially accurate saturation by the acid of the unsaturated hydrocarbon molecules, causing the mixture of oil and acid to form a further spray to allow further oxidation of any tar in the hydrocarbon and collecting the spray on a solid surface.

4. The process of refining hydrocarbons by interaction between a hydrocarbon component and a sulphuric acid component, which comprises: forming one component into a thin moving film; projecting the remaining component in atomized condition into contact with said film to provide intimate contact between the molecules of the two; permitting said components to remain in said intimate contact for a reacting period of time, under atmospheric conditions.

5. The process of claim 4 with the atomization of the reacted mixture into air for oxidation of products of the reaction.

6. The process of claim 5, in which the aerated mixture is again atomized into air for further oxidation.

7. The process of claim 4, in which the atomized component is the acid.

8. The process of claim 4 wherein the quantities of the components are substantially those theoretically required for complete chemical reaction.

9. The process of claim 4 wherein the atomized component is caused to forcibly impinge upon the film.

GEORGE W. EDWARDS.

REFERENCES CITED

The following references are of record in the file of this patent:

UNITED STATES PATENTS

| Number | Name | Date |
|---|---|---|
| 542,756 | Ekenberg | July 16, 1895 |
| 1,272,979 | Maitland | July 16, 1918 |
| 1,575,116 | Jones | Mar. 2, 1926 |
| 1,896,470 | Stuk | Feb. 7, 1933 |

FOREIGN PATENTS

| Number | Country | Date |
|---|---|---|
| 377,480 | Great Britain | July 28, 1932 |
| 461,772 | Great Britain | Feb. 24, 1937 |